(12) United States Patent
Otto et al.

(10) Patent No.: US 9,873,998 B2
(45) Date of Patent: Jan. 23, 2018

(54) MAST ARRANGEMENT AND METHOD FOR CONNECTING A TOOL UNIT TO A MAST CARRIAGE OF A MAST ARRANGEMENT

(71) Applicant: BAUER MASCHINEN GMBH, Schrobenhausen (DE)

(72) Inventors: Hans-Philipp Otto, Aichach (DE); Wolfgang Kraus, Schrobenhausen (DE)

(73) Assignee: BAUER Maschinen GmbH, Schrobenhausen (DE)

(*) Notice: Subject to any disclaimer, the term of this patent is extended or adjusted under 35 U.S.C. 154(b) by 470 days.

(21) Appl. No.: 14/609,100

(22) Filed: Jan. 29, 2015

(65) Prior Publication Data

US 2015/0211206 A1    Jul. 30, 2015

(30) Foreign Application Priority Data

Jan. 29, 2014   (EP) .................................... 14153090

(51) Int. Cl.
  *E21B 7/02*  (2006.01)
  *E02F 3/36*  (2006.01)
  (Continued)

(52) U.S. Cl.
  CPC .............. *E02F 3/3654* (2013.01); *B60D 1/62* (2013.01); *E02F 9/2271* (2013.01);
  (Continued)

(58) Field of Classification Search
  CPC ... E02F 9/22; E02F 9/2275; E02F 3/36; E02F 3/3654; E02F 9/2271; E02F 3/96;
  (Continued)

(56) References Cited

U.S. PATENT DOCUMENTS 4,738,463 A * 4/1988 Poore .................. A01B 59/062
                                                        280/420
5,269,107 A    12/1993 Klemm
                (Continued)

FOREIGN PATENT DOCUMENTS

CN       101451427 A     6/2009
CN       102220838 A    10/2011
                (Continued)

OTHER PUBLICATIONS

English language translation of Chinese Search Report dated Jun. 24, 2016, which corresponds to Chinese Patent Application No. 201510045699.8 and is related to U.S. Appl. No. 14/609,100.
                (Continued)

*Primary Examiner* — Scott A. Smith
(74) *Attorney, Agent, or Firm* — Studebaker & Brackett PC

(57) ABSTRACT

The invention relates to a mast arrangement for a construction machine with a mast having a mast guide, along which a mast carriage is supported in a movable manner which is connected to a hydraulic source and has a first hydraulic coupling part for hydraulically connecting a tool unit to a hydraulic source on the mast carriage. According to the invention provision is made for the tool unit to have a tool guiding device. On a frame of the tool unit a second hydraulic coupling part is arranged. Upon movement of mast carriage and tool unit towards each other along the mast guide the first hydraulic coupling part of the mast carriage can be linked up hydraulically to the second hydraulic coupling part on the tool unit. A locking device is provided which is spaced from the hydraulic coupling parts and has at least one hydraulically operable latch bolt.

13 Claims, 2 Drawing Sheets

Figure 3:
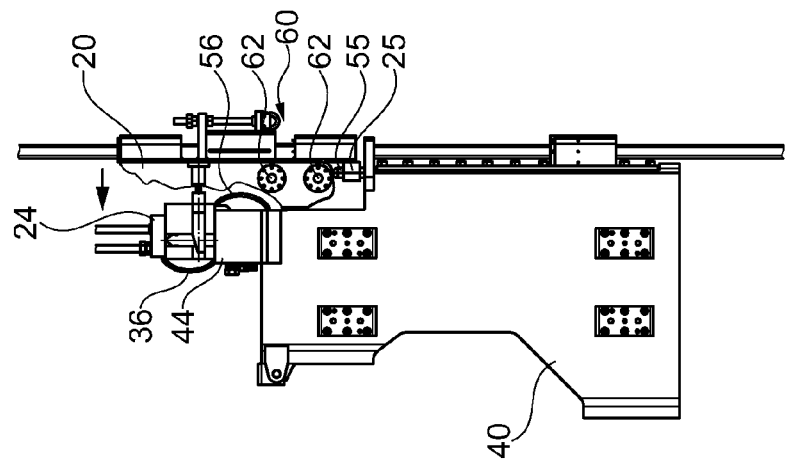

(51) Int. Cl.
  *E02F 9/22* (2006.01)
  *B60D 1/62* (2006.01)
  *B60D 1/64* (2006.01)
  *F16L 39/00* (2006.01)

(52) U.S. Cl.
  CPC .............. *E02F 9/2275* (2013.01); *E21B 7/02* (2013.01); *E21B 7/022* (2013.01); *B60D 1/64* (2013.01); *E21B 7/023* (2013.01); *F16L 39/00* (2013.01); *Y10T 29/494* (2015.01)

(58) Field of Classification Search
  CPC . E21B 7/02; E21B 7/023; E21B 7/022; B60D 1/62; B60D 1/64; F16L 39/00; F16L 37/56
  USPC ............... 173/1, 184, 185, 152, 42, 28, 147; 285/123.12, 124.1, 124.5, 124.4, 24, 27, 285/45, 62, 26; 37/468; 137/595, 614.04
  See application file for complete search history.

(56) References Cited

U.S. PATENT DOCUMENTS

| | | | |
|---|---|---|---|
| 5,316,347 A | 5/1994 | Arosio | |
| 5,829,337 A * | 11/1998 | Barden | E02F 3/3654 137/595 |
| 7,464,967 B2 | 12/2008 | Mieger et al. | |
| 7,963,054 B2 * | 6/2011 | Wimmer | E02F 3/3627 172/272 |
| 8,187,020 B2 * | 5/2012 | Alguera Gallego et al. | B60D 1/64 439/378 |
| 8,262,136 B2 * | 9/2012 | Lundgren | E02F 3/3654 248/75 |
| 8,336,922 B2 * | 12/2012 | Tiberghien | F16L 37/56 137/594 |
| 8,567,519 B2 | 10/2013 | Poeckl | |
| 8,585,098 B2 * | 11/2013 | Lundgren | E02F 3/3654 285/124.2 |
| 8,740,257 B2 * | 6/2014 | Grob | F16L 39/04 285/123.12 |
| 2002/0157287 A1 * | 10/2002 | Mieger | E02F 3/3654 37/468 |
| 2006/0022455 A1 | 2/2006 | Mieger et al. | |
| 2011/0253400 A1 | 10/2011 | Poeckl | |
| 2013/0000988 A1 | 1/2013 | Lanzl et al. | |
| 2013/0062126 A1 | 3/2013 | Thorne | |

FOREIGN PATENT DOCUMENTS

| | | |
|---|---|---|
| DE | 330322 C | 12/1920 |
| DE | 3303262 A1 | 8/1984 |
| DE | 3721526 A1 | 1/1989 |
| DE | 4222193 A1 | 1/1993 |
| DE | 4312368 A1 | 10/1994 |
| DE | 29810118 U1 | 10/1998 |
| DE | 102004037459 A1 | 2/2006 |
| EP | 0963688 A2 | 12/1999 |
| EP | 1193349 A2 | 4/2002 |
| EP | 1983149 A2 | 10/2008 |
| EP | 2540954 A1 | 1/2013 |

OTHER PUBLICATIONS

European Search Report; EP14153090; dated Jun. 2, 2014.

* cited by examiner

MAST ARRANGEMENT AND METHOD FOR CONNECTING A TOOL UNIT TO A MAST CARRIAGE OF A MAST ARRANGEMENT

The invention relates to a mast arrangement for a construction machine, with a mast having a mast guide, along which a mast carriage is supported in a movable manner which is connected to a hydraulic source and has a first hydraulic coupling part for hydraulically connecting a tool unit to the hydraulic source on the mast carriage, in accordance with the preamble of claim 1. The invention furthermore relates to a method for connecting a tool unit to a mast carriage of a mast arrangement.

A generic mast arrangement and a generic method can be taken from EP 1 983 149 A2 for example. Here, a so-called working device carriage is suspended by means of connecting bolts on a mast carriage. Through upward movement of the feed carriage the working device carriage rests directly on a contact plate on the feed carriage. In this mounted position the working device carriage with the mast carriage can then be fastened manually by means of additional locking bolts. Moreover, a hydraulic connection must also be established manually.

Another so-called leader with a leader carriage and a tool unit can be taken from DE 33 03 262 A1. No mention is made of a releasable connection between leader carriage and tool unit.

From DE 10 2004 037 459 A1 a hydraulic quick coupling on two mast parts is known which can be connected to each other through a displacing movement. A first hydraulic coupling part supported in a spring-mounted manner is removed from guide bolts and slid at the same time onto centering bolts of the opposite coupling part.

The invention is based on the object to provide a mast arrangement and a method for connecting a tool unit to a mast carriage of a mast arrangement, which enable a reliable and efficient connection of mast carriage and a tool unit.

The object is achieved on the one hand by a mast arrangement having the features of claim 1 and on the other hand by a method having the features of claim 13. Preferred embodiments of the invention are stated in the dependent claims.

The mast arrangement according to the invention is characterized in that the tool unit has a tool guiding means, with which the tool unit can be fixed and positioned on the mast guide, on a frame of the tool unit a second hydraulic coupling part is arranged which corresponds to the first hydraulic coupling part of the mast carriage, upon movement of mast carriage and tool unit towards each other along the mast guide the first hydraulic coupling part of the mast carriage can be linked up hydraulically to the second hydraulic coupling part on the tool unit and in that a locking means is provided which is spaced from the hydraulic coupling parts and has at least one hydraulically operable latch bolt, with which the frame of the tool unit can be connected mechanically to the mast carriage.

In the method according to the invention for connecting a tool unit to a mast carriage of the mast arrangement provision is made in that the tool unit has a tool guiding means, with which the tool unit is fixed and positioned on a mast guide of a mast of the mast arrangement of a construction apparatus, the mast carriage is moved along the mast guide of the mast towards the fixed tool unit, wherein a first hydraulic coupling part on the mast carriage is coupled with a corresponding second hydraulic coupling part on the tool unit and a hydraulic source on the mast carriage is connected hydraulically to the tool unit and subsequently at least one latch bolt of a locking means is operated hydraulically, wherein the mast carriage, whilst being spaced from the hydraulic coupling parts, is connected mechanically to the frame of the tool unit.

A basic idea of the invention resides in the fact that the tool unit is provided with a tool guiding means in order to enable the tool unit to be guided directly on the mast guide. After the tool unit has been fixed and positioned on the mast guide a coupling of the mast carriage with the tool unit can be effected in a largely automatic fashion. When the mast carriage and the tool unit are moved towards each other or pushed together through a movement of the mast carriage by the carriage drive, in particular a rope winch or a hydraulic cylinder, a connection between the two hydraulic coupling parts can initially be effected. In this manner, the delicate hydraulic coupling parts which preferably have a certain spring-mounted support can be coupled without any difficulty. Afterwards or at the same time the mechanical locking between the mast carriage and the tool unit can be carried out by way of a locking means that is spaced from the hydraulic coupling. The mechanical locking can be effected directly on the frame of the tool unit with the mast carriage.

In this manner a largely automatic connection of tool unit and mast carriage is rendered possible. This permits a quick and efficient exchange of the tool unit without the time-consuming engagement of operating personnel. Through a single movement of the mast carriage or the tool unit the hydraulic as well as the mechanical connection of both components can be established.

A preferred embodiment of the invention resides in the fact that the first hydraulic coupling part and the second hydraulic coupling part have several coupling plugs and coupling sleeves respectively. Basically, on one hydraulic coupling part solely coupling plugs and on the opposite hydraulic coupling part solely the corresponding coupling sleeves can be provided. Coupling plugs and coupling sleeves are each designed such that they form a matching hydraulic connection in the joined state. In addition to plugs and sleeves for hydraulic connections provision can also be made for connection elements for electric and data lines in the coupling area which are connected correspondingly. The hydraulic source can be a hydraulic power pack in particular which is arranged on a carrier implement or separately thereto. Through appropriate lines the hydraulic source is line-connected to the first hydraulic coupling part on the mast carriage.

According to a further development of the invention an especially unproblematic plug-in of the individual coupling elements results from the fact that the coupling plugs and/or the coupling sleeves are supported in a spring-mounted manner on the mast carriage or the tool unit. The spring-mounted support can be provided on one hydraulic coupling part only or preferably on both coupling parts. For this, the coupling plugs or the coupling sleeves can be supported individually or the coupling plugs and the coupling sleeves can be collectively arranged in a firm manner in a coupling block which is itself supported in a spring-mounted manner. The spring-mounted support can be realized through metal springs or elastic rubber elements (see, e.g., 29, FIG. 4).

Basically, the first hydraulic coupling part and the second hydraulic coupling part can be arranged at any location of the opposite sides of mast carriage and tool unit respectively. A preferred embodiment of the invention resides in the fact that the first hydraulic coupling part and the second hydraulic coupling part are arranged in a spaced manner to the mast guide, wherein on the tool unit or the mast carriage between the hydraulic coupling parts and the mast guide a receiving space is formed, in which at least one latch bolt of the locking means is arranged. This has the advantage that a mechanical locking of mast carriage and tool unit can be effected in close proximity to the mast guide. This ensures a particularly stable connection. At the same time, the two coupling parts are spaced further away from the mast guide whereby an easier and more reliable plug-in is ensured.

The latch bolt can be designed and supported in various ways. In addition to cylindrical bolts use can also be made of curved, pivotable latch bolts. For an especially stable connection it is advantageous in accordance with a further development of the invention that the at least one latch bolt is directed transversely to a longitudinal axis of the mast. Hence, the locking is also effected transversely to the direction of movement of the two carriage elements. By preference, two latch bolts lying inversely opposite each other are provided so that a form-closed locking can take place on both sides on the mast carriage.

Furthermore, according to an embodiment of the invention it is preferred that the at least one latch bolt is driven by an assigned hydraulic cylinder. For this, for each latch bolt one hydraulic cylinder can be provided. By preference, the latch is displaced in the direct operating direction of the hydraulic cylinder. According to a modification provision can be made for one hydraulic cylinder to adjust two or more latch bolts. Between hydraulic cylinder and the single or several latch bolts a transmission mechanism, such as a wedge-type sliding mechanism, can be provided.

The mast arrangement according to the invention allows several arrangement variants of the locking means on the mast carriage or on the tool unit. In the case of a preceding coupling of the hydraulic coupling the locking means can be provided in its entirety on the tool unit. Following the hydraulic connection a hydraulic cylinder could thus be operated on the tool unit for the purpose of locking.

According to a further development of the invention a particularly advantageous embodiment is provided in that the at least one latch bolt is arranged on the mast carriage and that in the connected state of mast carriage and tool unit the at least one latch bolt is arranged in the receiving space on the tool unit. With this arrangement on a mast carriage the latch bolt can be operated at any time as it is always connected to the hydraulic source on the mast carriage.

Furthermore, according to another embodiment of the invention a particularly stable locking is achieved in that the latch bolt can be moved into a latch opening on the frame of the tool unit. Hence, a mechanical connection is effected directly on the frame whereby the hydraulic coupling parts are relieved of mechanical stress.

According to the invention a further improvement in establishing the hydraulic connection is preferably attained in that on the tool unit and/or the mast carriage at least one centering bolt is provided which, upon movement of tool unit and mast carriage towards each other, engages with a centering bore on the opposite mast carriage or the opposite tool unit even before a hydraulic link-up. The centering bolt is arranged on the frame of the mast carriage or tool unit or by preference directly on one of the block-like hydraulic coupling parts. By preference, two or more centering bolts are provided. The centering bolt has a tapering at its free end in order to facilitate the pushing-together process.

Another preferred embodiment of the invention resides in the fact that at least one hydraulic coupling part has an adjustable cover which, upon movement of the hydraulic coupling parts towards each other, can be adjusted from a covering position to a release position. By preference, a cover is in each case arranged on both hydraulic coupling parts. The cover can be an adjustable plate element which is held e.g. by a spring in the covering position. In the covering position the coupling plugs or coupling sleeves are protected by the cover against external influences, in particular against dirt. On moving mast carriage and tool unit towards each other the cover element can be moved by an operating cam in a direction contrary to the spring tension from the covering position into a release position, in which the coupling plugs or coupling sleeves of the hydraulic coupling parts are exposed. Upon a further movement the coupling plugs and coupling sleeves can thus be connected to each other. Upon separation the cover element is then moved through spring tension back into the covering position.

Basically, the tool unit can have any type of working device. Preferred embodiments of the invention reside in the fact that the tool unit has a vibrator, a drill drive or a hydraulic hammer.

Finally, provision is made in accordance with the invention for the afore-described mast arrangement to be used with a construction machine which has a carrier implement with a mast arrangement and a substantially vertical mast.

Figure 2:
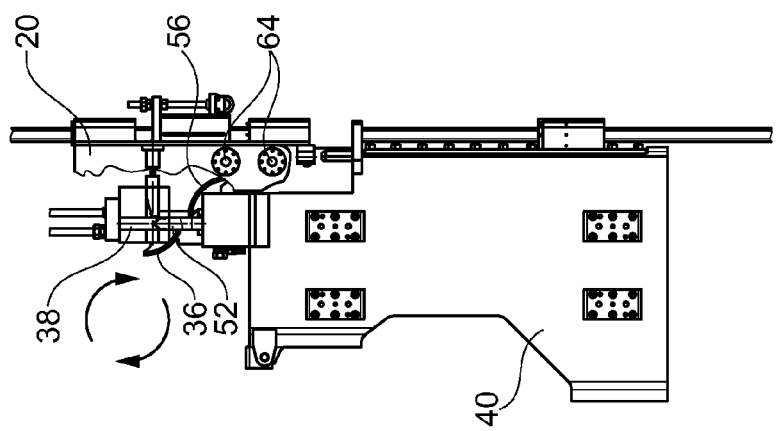
Figure 1:
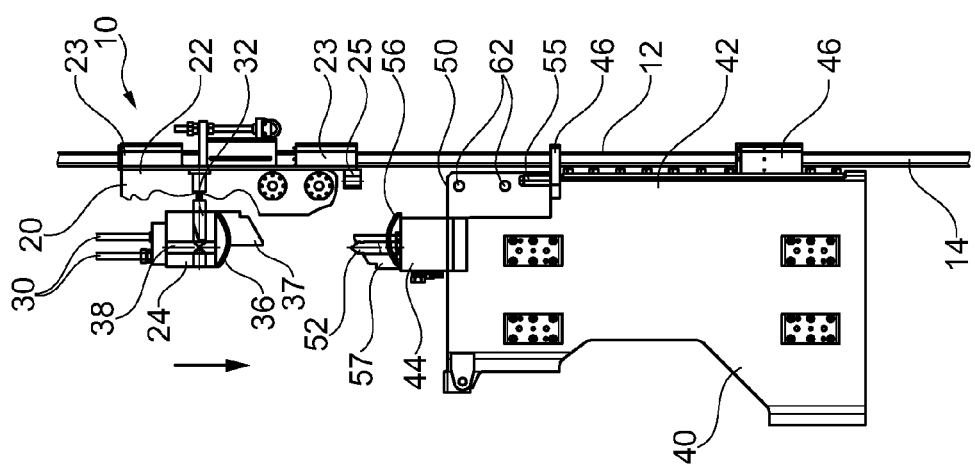
Figure 6:
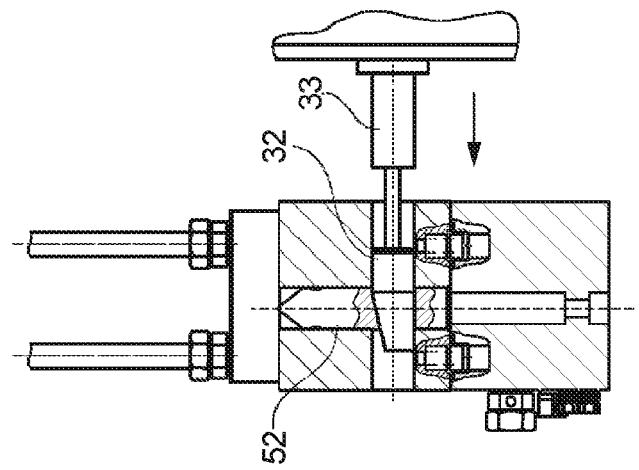
Figure 5:
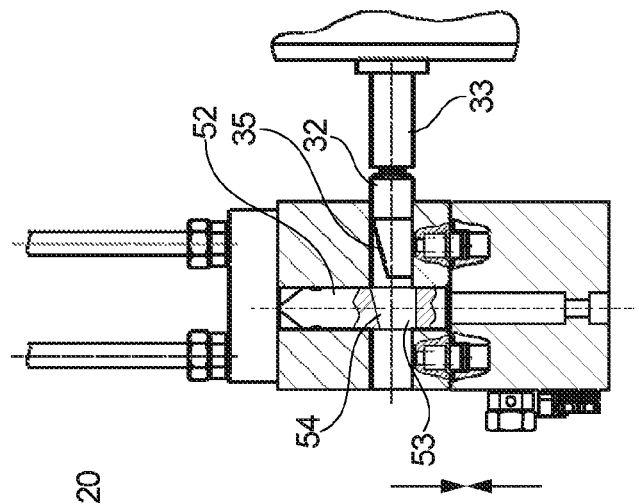
Figure 4:
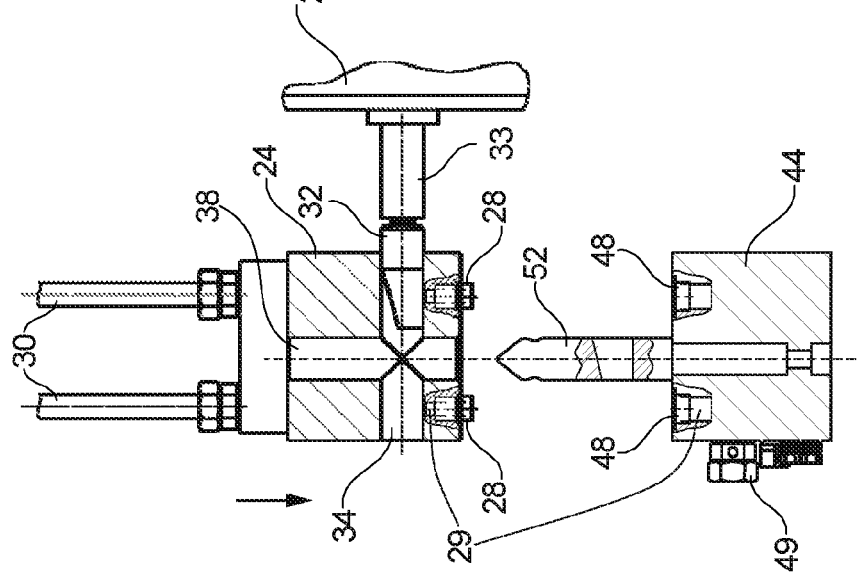

The invention is described further hereinafter by way of preferred embodiments illustrated schematically in the drawings, wherein show:

FIG. 1 a schematic and partially depicted mast arrangement according to the invention with a mast carriage and a tool unit before coupling;

FIG. 2 the mast arrangement according to FIG. 1 in a state during coupling;

FIG. 3 the mast arrangement of FIGS. 1 and 2 on completion of coupling;

FIG. 4 an enlarged partial cross-sectional view of the hydraulic coupling parts of the mast arrangement according to the invention of FIG. 1 immediately before coupling;

FIG. 5 the arrangement of the hydraulic coupling parts of FIG. 4 in a state during coupling; and FIG. 6 the arrangement of the hydraulic coupling parts on completion of coupling.

A mast arrangement 10 according to the invention is shown partially and in a schematic manner in FIGS. 1 to 3. Of the vertical mast 12, which is only indicated and can be a leader for example, a rail-shaped mast guide 14 is substantially illustrated. Along the mast guide 14 a mast carriage 20 is supported in a displaceable manner on the mast 12. The displacement can be effected by means of a rope winch, not depicted, or a hydraulic positioning cylinder. The mast 12 is fixed in a substantially vertical alignment on a non-depicted carrier implement of a construction machine, in particular for special foundation construction.

In the illustrated embodiment a vibrator or vibration exciter is provided as tool unit 40 which serves to vibrate or drive sheet piles or metal piles into the ground. To convert a construction machine to such a vibratory operation the tool unit 40 is fixed on the mast guide 14 of the mast 12. The tool unit 40 has a metal frame 42 which has a tool guiding means 46 on its side facing towards the mast 12. The tool guiding means 46 is designed with clamp-like slide shoes which clasp the rail-shaped mast guide 14 in a known manner.

After the tool unit 40 has been fixed on the mast guide 14 the mast carriage 20 is moved along the mast guide 14 in the downward direction towards the tool unit 40. The mast carriage 20 also has a carriage frame 22, on the guided side of which carriage guiding elements 23 are arranged. Corresponding to the tool guiding means 46 of the tool unit 40 the carriage guiding elements 23 can be designed as clamp-like slide shoes.

For a hydraulic connection of mast carriage 20 and tool unit 40 a first block-like hydraulic coupling part 24, which is connected via hydraulic lines 30 to a hydraulic source, is arranged on the mast carriage 20. The hydraulic source usually is a hydraulic power pack that can be arranged on the carrier implement of the construction machine. Corresponding to this first hydraulic coupling part 24 on the mast carriage 20 a block-like second hydraulic coupling part 44 is arranged on the tool unit 40. For protection of the connecting elements the first hydraulic coupling part 24 has a first cover 36 that is designed as a curved plate. A corresponding second cover 56 is also provided on the second hydraulic coupling part 44 of the tool unit 40.

In the illustration according to FIG. 1 the first cover 36 and the second cover 56 are each shown in their covering position, in which the covers 36, 56 protect the respective connecting elements on both hydraulic coupling parts 24, 44.

When mast carriage and tool unit 40 are further pushed together, as depicted in FIG. 2, a first operating cam 37 on the first hydraulic coupling part 24 gets into operative connection with the opposite second hydraulic coupling part 44 so that the second cover 56 on the second hydraulic coupling part 44 is thereby pushed from the covering position according to FIG. 1 into a release position, in which the connections of the second hydraulic coupling part 44 are exposed. Accordingly, a second operating cam 57 located on the second hydraulic coupling part 44 of the tool unit 40 also operates the first cover 36 on the first hydraulic coupling part 24. Thus, the first cover 36 is also pivoted from the covering position according to FIG. 1 into a release position, as indicated by the arrows in FIG. 2.

The respective release position of the first cover 36 and the second cover 56, in which these are arranged in a lateral area with regard to the respective hydraulic coupling part 24, 44, is shown in FIG. 3. During this coupling movement a centering bolt 52 projecting from the second hydraulic coupling part 44 also engages with a centering bore 38 on the first hydraulic coupling part 24. In addition, a locking of the two hydraulic coupling parts 24, 44 can be effected by means of a transversely directed locking element 32 which shall be described in greater detail hereinafter in conjunction with FIGS. 4 to 6.

In addition to the hydraulic connection of mast carriage 20 and tool unit 40 a mechanical connection is also established between both components. For this purpose provision is made on the tool unit 40 for a locking means 60, of which only two latch bolts 62 are shown in plan view. The two hydraulic coupling parts 24, 44 are spaced from the mast guide 14, with a receiving space 50 being formed for an overlapped pushing together of mast carriage 20 and tool unit 40. The latch bolts 62 are operated by a hydraulic cylinder, not shown, on the frame 42 of the tool unit 40. In the pushed-together end position according to FIG. 3 the latch bolts 62 can be moved transversely to the longitudinal mast direction out of the frame 42 and into two corresponding latch openings 64 on the carriage frame 22 of the mast carriage 20. In this connection it should be pointed out that the locking means 60 is designed symmetrically so that on the opposite side two further latch bolts 62 can be moved correspondingly into two further latch openings 64 of the mast carriage.

For a further stable mechanical connection a receiving bolt 55 is provided on the tool unit 40, onto which a centering sleeve 25 disposed on the mast carriage 20 is moved during pushing together. This preceding mechanical centering ensures that the latch bolts 62 are arranged in a centered manner with respect to the latch openings 64 in order to guarantee a precise connection free of play.

In FIGS. 4 to 6 the first hydraulic coupling part 24 and the second hydraulic coupling part 44 are illustrated in greater detail. In particular, it can be seen that in the illustrated embodiment the first hydraulic coupling part 24 has several coupling plugs 28 which are line-connected via internal bores, not shown, to the hydraulic lines 30. Corresponding to the coupling plugs 28 suitable coupling sleeves 48 are arranged on the second hydraulic coupling part 44.

According to the illustration pursuant to FIG. 5 the two hydraulic coupling parts 24, 44 are moved towards each other in such a manner that they abut, wherein the coupling plugs 28 are inserted in a fluid-tight manner into the coupling sleeves 48 to establish the hydraulic connection. The coupling sleeves 48 in the second hydraulic coupling part 44 are also connected via internal bores, not shown, to lateral connections 49, by way of which hydraulic consumers, in particular a hydraulic drive, can be supplied with hydraulic fluid on the tool unit 40.

In the block-like basic body of the first hydraulic coupling part 24 a centering bore 38 aligned in the longitudinal mast direction and a cross bore 34 directed transversely thereto are introduced. In the cross bore 34 a wedge-shaped locking element 32 is supported in a displaceable manner. By means of a positioning cylinder 33 located on the mast carriage 20 the wedge-shaped locking element 32 can be displaced from a retracted position shown in FIGS. 4 and 5 to a locking position according to FIG. 6.

As can be taken from the sequence of FIGS. 4 to 6, when the first hydraulic coupling part 24 and the second hydraulic coupling part 44 are moved towards each other the projecting centering bolt 52 initially engages with the centering bore 38. In this manner, it is ensured that the two hydraulic coupling parts 24, 44 are aligned to each other in a centered manner prior to a contact of coupling plugs 28 and coupling sleeves 48. Through a further movement of the mast carriage 20 relative to the tool unit 40 the abutting position according to FIG. 5 is reached, in which the hydraulic connection is established. Subsequently, the locking element 32 is moved by the positioning cylinder 33 from the retracted position into the locking position. As a result, the locking element 32 engages with an adjustment opening 53 designed in the centering bolt 52. Due to an upper start-up slope 54 of the adjustment opening 53, which corresponds to a start-up slope 35 of the locking element 32, the centering bolt 52 and thus the second hydraulic coupling part 44 is additionally clamped with respect to the first hydraulic coupling part 24, as shown in FIG. 6.

The invention claimed is:

1. A mast arrangement for a construction machine, the mast arrangement comprising:
    a mast having a mast guide,
    a mast carriage configured to be supported in a movable manner along the mast guide,
    a hydraulic source connected to the mast carriage, the mast carriage comprising a first hydraulic coupling part for hydraulically connecting a tool unit to the hydraulic source on the mast carriage,
    wherein
        the tool unit comprises a tool guiding means configured to fix and position the tool unit on the mast guide,
        the tool unit comprises a frame,
        a second hydraulic coupling part is configured to be arranged on the frame,
        upon movement of the mast carriage and the tool unit towards each other along the mast guide, the first hydraulic coupling part of the mast carriage is configured to link up hydraulically to the second hydraulic coupling part on the tool unit, a locking means is configured to be spaced from the first hydraulic coupling part and the second hydraulic coupling part, and the locking means comprises at least one hydraulically operable latch bolt configured to mechanically connect the frame of the tool unit to the mast carriage, and the tool unit and the mast carriage are configured to be movable along the mast after being hydraulically connected.

2. The mast arrangement according to claim 1, wherein
the first hydraulic coupling part and the second hydraulic coupling part have several coupling plugs and coupling sleeves, respectively.

3. The mast arrangement according to claim 2, wherein
the coupling plugs or the coupling sleeves are supported in a spring-mounted manner on the mast carriage or the tool unit, respectively.

4. The mast arrangement according to claim 1, wherein
the first hydraulic coupling part and the second hydraulic coupling part are arranged in a spaced manner to the mast guide,
a receiving space is configured to receive the locking means, and
the receiving space is provided on the tool unit or on the mast carriage between the first hydraulic coupling part, the second hydraulic coupling part and the mast guide.

5. The mast arrangement according to claim 4, wherein
the at least one hydraulically operable latch bolt is driven by an assigned hydraulic cylinder.

6. The mast arrangement according to claim 4, wherein
the at least one hydraulically operable latch bolt is arranged on the mast carriage, and
in the connected state of the mast carriage and the tool unit, the at least one hydraulically operable latch bolt is arranged in the receiving space on the tool unit.

7. The mast arrangement according to claim 4, wherein
the hydraulically operable latch bolt is configured to be moved into a latch opening on the frame of the tool unit.

8. The mast arrangement according to claim 1, wherein
the at least one hydraulically operable latch bolt is directed transversely to a longitudinal axis of the mast.

9. The mast arrangement according to claim 1, wherein
on the tool unit or the mast carriage, at least one centering bolt is provided, which, upon movement of tool unit and mast carriage towards each other, engages with a centering bore on the opposite mast carriage or the opposite tool unit, respectively, even before a hydraulic link-up.

10. The mast arrangement according to claim 1, wherein
at least one hydraulic coupling part has an adjustable cover, which, upon movement of the first hydraulic coupling part and the second hydraulic coupling part towards each other, is configured to be adjusted from a covering position to a release position.

11. The mast arrangement according to claim 1, wherein
the tool unit as a vibrator, a drill drive or a hydraulic hammer.

12. A construction machine comprising:
a carrier implement; and
a mast arrangement,
wherein
the mast arrangement comprises:
a substantially vertical mast having a mast guide,
a mast carriage configured to be supported in a movable manner along the mast guide,
a hydraulic source connected to the mast carriage, the mast carriage comprising a first hydraulic coupling part for hydraulically connecting a tool unit to the hydraulic source on the mast carriage,
wherein
the tool unit comprises a tool guiding means configured to fix and position the tool unit on the mast guide,
the tool unit comprises a frame,
a second hydraulic coupling part is configured to be arranged on the frame,
upon movement of the mast carriage and the tool unit towards each other along the mast guide, the first hydraulic coupling part of the mast carriage is configured to link up hydraulically to the second hydraulic coupling part on the tool unit,
a locking means is configured to be spaced from the first hydraulic coupling part and the second hydraulic coupling part, and the locking means comprises at least one hydraulically operable latch bolt configured to mechanically connect the frame of the tool unit to the mast carriage, and
the tool unit and the mast carriage are configured to be movable along the substantially vertical mast after being hydraulically connected.

13. A method for connecting a tool unit to a mast carriage of a mast arrangement, the mast arrangement comprising: a mast having a mast guide, a mast carriage configured to be supported in a movable manner along the mast guide, a hydraulic source connected to the mast carriage, the mast carriage comprising a first hydraulic coupling part for hydraulically connecting a tool unit to the hydraulic source on the mast carriage, wherein the tool unit comprises a tool guiding means configured to fix and position the tool unit on the mast guide, the tool unit comprises a frame, a second hydraulic coupling part is configured to be arranged on the frame, upon movement of the mast carriage and the tool unit towards each other along the mast guide, the first hydraulic coupling part of the mast carriage is configured to link up hydraulically to the second hydraulic coupling part on the tool unit, a locking means is configured to be spaced from the first hydraulic coupling part and the second hydraulic coupling part, the locking means comprises at least one hydraulically operable latch bolt configured to mechanically connect the frame of the tool unit to the mast carriage, and the tool unit and the mast carriage are configured to be movable along the mast after being hydraulically connected, the method comprising:
fixing and positioning the tool unit on the mast guide of the mast of the mast arrangement with the tool guiding means,
moving the mast carriage along the mast guide of the mast towards the fixed tool unit,
coupling the first hydraulic coupling part on the mast carriage with the second hydraulic coupling part on the tool unit, hydraulically connecting the hydraulic source on the mast carriage to the tool unit, and subsequently hydraulically operating the at least one hydraulically operable latch bolt of the locking means, spacing the mast carriage from the first hydraulic coupling part and the second hydraulic coupling part while mechanically connecting the mast carriage to the frame of the tool unit, and moving the tool unit and the mast carriage along the mast after being hydraulically connected.

\* \* \* \* \*